United States Patent [19]
Yamaki

[11] Patent Number: 6,163,273
[45] Date of Patent: Dec. 19, 2000

[54] SELECTIVE CALL RECEIVER WITH IMPROVED SETTING OF TEST MODE

[75] Inventor: Yoichi Yamaki, Machida, Japan

[73] Assignee: Matsushita Electric Industrial Co., Ltd., Osaka, Japan

[21] Appl. No.: 08/312,959

[22] Filed: Sep. 30, 1994

Related U.S. Application Data

[63] Continuation of application No. 07/909,714, Jul. 7, 1992, abandoned.

[30] Foreign Application Priority Data

Aug. 8, 1991 [JP] Japan ................................. 3-199118

[51] Int. Cl.[7] .................................................. H04B 17/00
[52] U.S. Cl. ...................................................... 340/825.44
[58] Field of Search ...................... 340/825.44, 825.47, 340/825.48; 455/228, 343, 38.3

[56] References Cited

U.S. PATENT DOCUMENTS

| | | | |
|---|---|---|---|
| 4,479,125 | 10/1984 | Mori | 340/825.44 |
| 4,599,615 | 7/1986 | Umetsu | 340/825.44 |

FOREIGN PATENT DOCUMENTS

| | | |
|---|---|---|
| 59-103435 | 6/1984 | Japan . |
| 2116230 | 4/1990 | Japan . |
| 2105077 | 3/1983 | United Kingdom . |
| 2124001 | 2/1984 | United Kingdom ........... H04B 17/00 |
| 2145259 | 3/1985 | United Kingdom . |

OTHER PUBLICATIONS

Panasonic "Thai Character Display Pager" EK–2099T, Service Manual, Order No. RTD 9106003C3, Jun. 1991.

Primary Examiner—Michael Horabik
Attorney, Agent, or Firm—Stevens, Davis, Miller & Mosher, L.L.P.

[57] ABSTRACT

A selective call receiver which can facilitate easy setting of a test mode without using an exclusive jig and also easy management and adjustment of a receiving unit. In the selective call receiver, a memory for storing therein test mode setting data is provided and turning ON of a control switch causes the data to be read out from the memory. When a test mode is judged to be present on the basis of the read-out data, a battery saving operation is released and receiving unit is continuously operated to set the receiving unit in the test mode. When a test mode is judged not to be present, the receiving unit is operated in its battery saving mode.

4 Claims, 2 Drawing Sheets

SELECTIVE CALL RECEIVER WITH IMPROVED SETTING OF TEST MODE

This application is a continuation of application Ser. No. 07/909,714, filed Jul. 7, 1992 (abandoned).

BACKGROUND OF THE INVENTION

The present invention relates to a selective call receiver which is used in an individual selective call radio communication system.

Such a portable selective call receiver is used when a user carrying the selective call receiver wishes to contact a party on a voice or signal basis by sending a calling signal in the form of radio waves to the party. For the purpose of reducing the consumption current of the selective call receiver, the selective call receiver employs an intermittent reception system which only supplies a current to the entire selective call receiver when a group to which the user belongs is called.

As users' demands for such a selective call receiver are diversified, development has recently been directed to making various sorts of selective call receivers having multiple functions. Meanwhile, such users' diversified demands actually will require service and manufacturing companies supplying the selective call receivers to users to expend a lot of cost and labor in the management and adjustment of the selective call receivers.

For example, in a so-called test mode in which its own selective calling number is confirmed or a receiving unit is adjusted, an exclusive jig comprising a special pin must be mounted on the receiving unit to display the selective calling number allocated to it or to release battery saving operation. That is, it is required that its own selective calling number, etc. be previously written in a ROM incorporated in the selective call receiver, the exclusive jig be inserted into the selective call receiver to operate a switch and thereby release the battery saving operation, the selective call receiver be adjusted or the functions thereof be confirmed.

Such a prior art selective call receiver as mentioned above, however, has had such a problem that, since the exclusive jig is required to set the selective call receiver in the test mode, the selective call receiver cannot be set in the test mode without the jig. Further, since the jig inserting work is required in addition to the data writing operation to the ROM, the work involved becomes complicated, requiring a lot of time.

SUMMARY OF THE INVENTION

It is an object of the present invention to provide a selective call receiver which can solve the above problems in the prior art and can facilitate easy setting of a test mode and easy adjustment and management without using an exclusive jig.

In accordance with an aspect of the present invention, the above object is attained by providing a selective call receiver which comprises a memory for storing therein test mode setting data, a control switch for causing data writing to the memory and setting of a test mode, and control means for analyzing the data read out from the memory through the operation of the control switch and when determining the presence of the test mode, for releasing battery saving operation and setting the selective call receiver in the test mode, whereby the setting of the test mode can be simplified.

DESCRIPTION OF THE PREFERRED EMBODIMENTS

Figure 1:
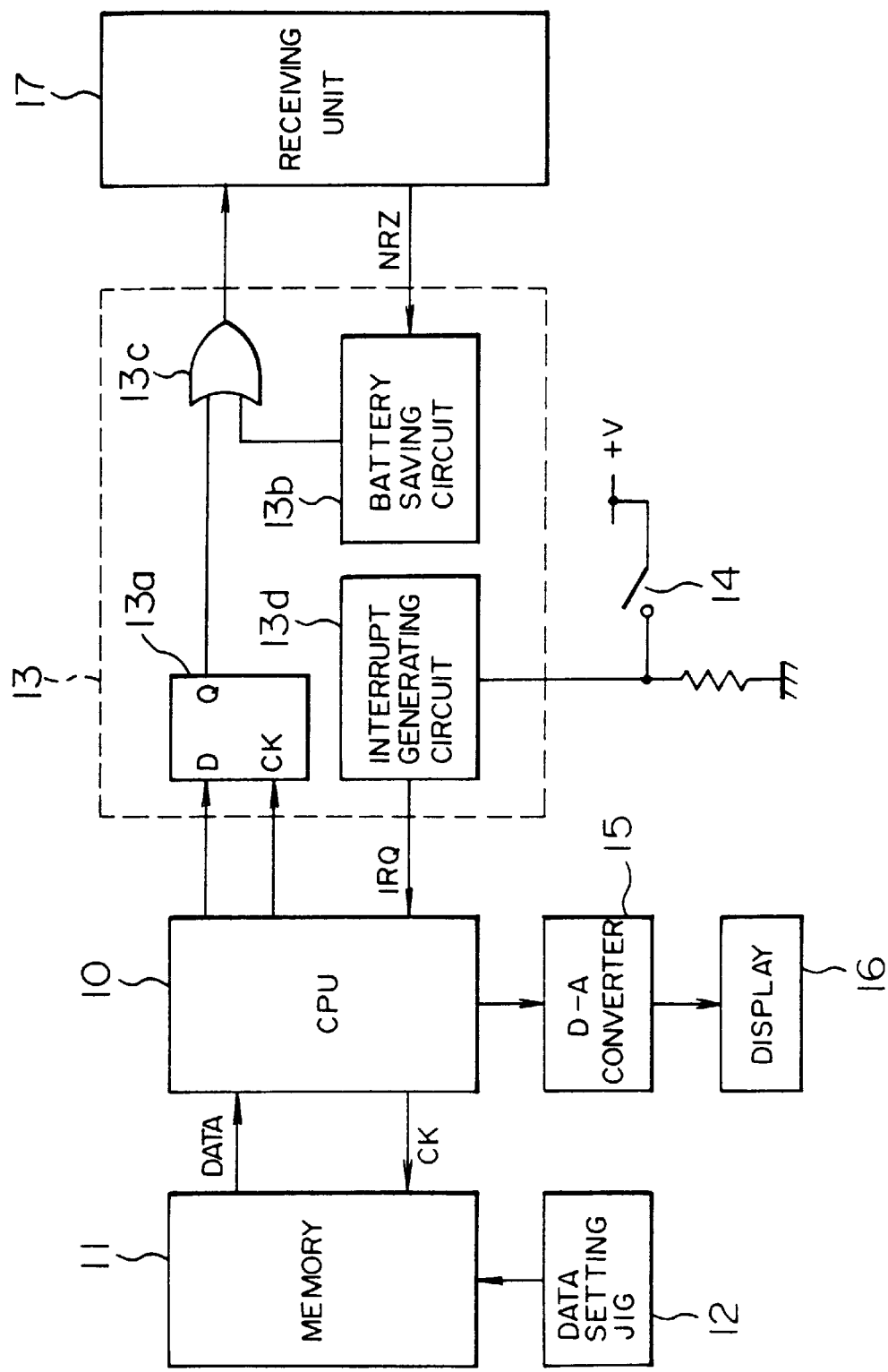
FIG. 1 is a block diagram of a selective call receiver in accordance with an embodiment of the present invention.

An embodiment of the present invention will be explained with reference to the accompanying drawings. Referring to FIG. 1, reference numeral 10 denotes a central processing unit (which will be referred to as the CPU, hereinafter) for generally controlling and managing the entire selective call receiver, and numeral 11 denotes a memory such as an erasable programmable read only memory (EPROM) connected to the CPU 10 to be electrically rewritable and erasable.

The memory 11 is connected with a data setting jig 12 so that the data setting jig 12 stores in the memory 11 a selective calling number, a test mode setting data, etc. The test mode setting data can be determined by the contents of a bit at its predetermined position. A decoder 13 includes a D flip-flop 13a for receiving a signal D and a clock CK as its clock input from the CPU 10, a battery saving circuit 13b for analyzing a signal NRZ from a receiving unit 17 to cause the receiving unit associated therewith to perform battery saving operation, an OR gate 13c for outputting a logical "OR" operation of outputs of the battery saving circuit 13b and D flip-flop 13a, and an interrupt generating circuit 13d for providing an interrupt signal to the CPU 10 when a control switch 14 is switched from its OFF state to the ON state. The battery saving circuit 13b is arranged to interrupt supply of a current to parts other than a clock circuit.

Also connected to the CPU 10 is such a display unit 16, such as a liquid crystal display, through a D-A converter 15.

Figure 2:
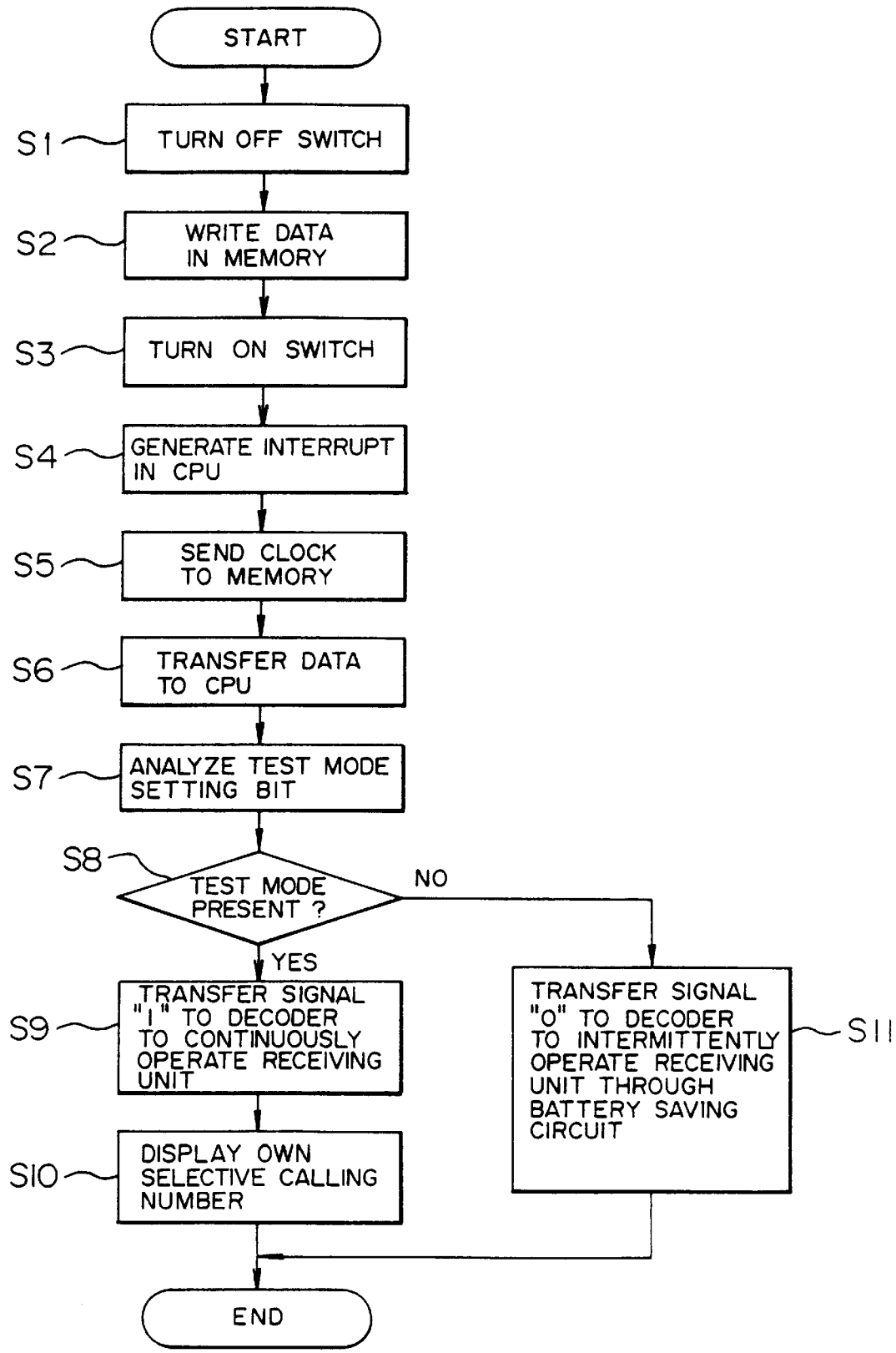
FIG. 2 is a flowchart showing the operational procedure of the selective call receiver of the embodiment.

The operation of the selective call receiver arranged as mentioned above will be explained by referring to a flowchart shown in FIG. 2. At a step S1, the control switch 14 is first put in its OFF state. At the next step S2, when the data setting jig 12 is operated, this causes a selective calling number and a test mode setting data to be stored in the memory 11. At the next step S3, turning ON of the control switch 14 causes the interrupt generating circuit 13d to generate an interrupt signal IRQ and to send it to the CPU 10 (step S4). The CPU 10, when receiving the interrupt signal IRQ, sends an accessing clock CK to the memory 11 (step S5), whereby the associated selective calling number and test mode setting data are read out from the memory 11 and then sent from the memory 11 to the CPU 10 (step S6).

The CPU 10 analyzes the received test mode setting data (step S7) and judges at the next step S8 whether to be a test mode. The judgement of the test mode (="1") causes the system to go to step S9, at which the CPU 10 sends the signal D of "1" and the clock CK to the D flip-flop 13a of the decoder 13, with the result that the D flip-flop 13a sends an output Q of "1" to the receiving unit 17 through the OR gate 13c. This results in that the operation of the battery saving circuit 13b is released so that the receiving unit is put in continuous operational mode. In other words, the selective call receiver is put in its test mode. Thereafter, at a step S10, the selective calling number data is sent to the display unit 16 through the D-A converter 15 so that its own selective calling number is displayed on the display unit 16.

Meanwhile, when it is judged at the step S8 that the system is not in the test mode, the system is shifted to a step S11 so that the CPU 10 sends the signal D of "0" and the clock CK to the D flip-flop 13a, thus resulting in that the D flip-flop 13a generates the output Q of "0". The receiving unit 17, when receiving the output Q of "0", supplies the non-zero return signal NRZ to the battery saving circuit 13*d* of the decoder 13, whereby the battery saving circuit 13*d* is operated to apply an operational signal as its output to the receiving unit 17 through the OR gate 13*c*, with the result that the receiving unit 17 performs its intermittent receiving operation.

As has been explained in the foregoing, in accordance with the present embodiment, the test mode setting data, etc. are previously stored in the memory 11 so that turning ON of the control switch 14 causes the CPU 10 to receive an interrupt, whereby the associated data stored in the memory 11 is transferred to the CPU 10 and then to the decoder 13 and the determination of the test mode causes the battery saving operation to be released to set the receiving unit in the test mode and also causes the selective calling number to be displayed on the display unit 16. As a result, unlike the prior art selective call receiver which needs the provision of an exclusive jig to set the selective call receiver in the test mode, the selective call receiver of the present invention enables the elimination of the need for such an exclusive jig, enables easy setting of the test mode only through the operation of the control switch, and also enables the facilitation of management and adjustment of the receiving unit.

Further, it is required to store only once the selective calling number and test mode setting data in the memory 11 through the data setting jig 12 at the initializing stage, and the step S2 can be omitted during operator's usual portable use of the selective call receiver, thus alleviating the need for the operator to carry the data setting jig during usual use.

In the case where a display unit is incorporated in the receiving unit 17, the use of the display unit 16 can be replaced by the use of the display unit incorporated in the receiving unit 17.

As has been explained in the foregoing, in accordance with the present invention, the test mode setting data, etc. are previously stored in the memory so that the operation of the control switch causes the data to be read out from the memory and sent to the CPU and then to the decoder, whereby the determination of the test mode causes the battery saving operation to be released so that the receiving unit is set in the test mode. Therefore, in the present invention, unlike the prior art requiring the use of an exclusive jig, the need for the exclusive jig can be eliminated, the setting of the test mode can be facilitated, and the management and adjustment of the receiving unit can be facilitated, to advantage.

What is claimed is:

1. A selective call receiver comprising:

a receiving unit for receiving a selective calling number allocated thereto;

means for selectively enabling a battery saving operation of said selective call receiver;

a memory for storing therein test mode setting data for setting the receiving unit in a test mode;

a control switch for controlling data writing to said memory and initiating of said test mode; and control means for analyzing data read out from said memory through operation of said control switch and for suspending said battery saving operation to set said selective call receiver in the test mode when said control means determines said test mode data to be present.

2. A selective call receiver as set forth in claim 1, wherein said control means includes a central processing unit for driving said memory to read out the data from the memory and for analyzing the read-out data, an interrupt generating circuit for providing an interrupt signal to said central processing unit in response to the operation of said control switch, a battery saving circuit for causing intermittent operation of said receiving unit, and a logical "OR" circuit for controlling interconnection between said battery saving circuit and the receiving unit.

3. A selective call receiver as set forth in claim 1, wherein said control means has display means for displaying thereon said selective calling number when said test mode is determined to be present.

4. A selective call receiver as set forth in claim 1, wherein said memory is rewritable.

\* \* \* \* \*